July 10, 1923. Re. 15,650

E. MOORE

GOVERNING DEVICE FOR INTERNAL COMBUSTION ENGINES

Original Filed June 3, 1919 2 Sheets-Sheet 1

INVENTOR
Edward Moore
BY
A. D. T. Libby
ATTORNEY

July 10, 1923. Re. 15,650

E. MOORE

GOVERNING DEVICE FOR INTERNAL COMBUSTION ENGINES

Original Filed June 3, 1919 2 Sheets-Sheet 2

INVENTOR
Edward Moore
BY
A. D. P. Libby
ATTORNEY

Reissued July 10, 1923.

Re. 15,650

UNITED STATES PATENT OFFICE.

EDWARD MOORE, OF NEWARK, NEW JERSEY, ASSIGNOR TO SPLITDORF ELECTRICAL COMPANY, OF NEWARK, NEW JERSEY.

GOVERNING DEVICE FOR INTERNAL-COMBUSTION ENGINES.

Original No. 1,363,745, dated December 28, 1920, Serial No. 301,563, filed June 3, 1919. Application for reissue filed July 7, 1921. Serial No. 483,057.

*To all whom it may concern:*

Be it known that I, EDWARD MOORE, a citizen of the United States, residing at Newark, in the county of Essex and State of New Jersey, have invented certain new and useful Improvements in Governing Devices for Internal-Combustion Engines, of which the following is a specification.

My invention relates to means for automatically governing the time of ignition of an internal combustion engine. In order to get the highest efficiency from such an engine it is essential that the spark be advanced in accordance with the increased speed of the engine. Where manual control is used the best sparking point is hard to find by the ordinary driver and it is the primary object of my invention to provide a governing device which will automatically give the proper sparking point without regard to any manual control. My invention is particularly applicable for use on automotive trucks which are more difficult of operation than so-called pleasure vehicles and consequently any work that can be taken off the driver is desirable.

In my application, S. N. 217,862, filed February 18, 1918, now Patent 1,388,743, issued August 23, 1921, I have shown and described a certain type of governing device for the purpose of controlling the time of ignition of the ignition generator.

There are conditions arising either by reason of the engine construction or the type of ignition used thereon or for other reasons, that considerable advance of the spark is necessary and this means that where a governor device of the type shown and described in the above mentioned application is used the centrifugally operated arms or weights have to move out a considerable distance from the center of rotation of the governor device in order to get the required movement of the member or members controlled by the weighted arms. This means a governing device of considerable diameter which is limited, so far as the standard type of magneto is concerned, by the height of the magneto shaft which has become standardized at a given fixed distance from the center line of the driving shaft to the bottom of the base. In order to meet these conditions as well as others which will be hereinafter pointed out, I have evolved the present design.

Where an ignition device is used of the magneto type, there is quite an impulse given by the magneto armature or rotor at the time the armature or rotor leaves the field poles. This is referred to as the magnetic kick of the rotating element. This kick is most prominent at low speed and has the effect of causing the weights of most any governing device to throw suddenly outward advancing the spark, which is detrimental, as the spark should be retarded at low speed. It is one of the objects of my present invention to overcome this "hunting" of the governor at low speed, at the same time the construction to prevent "hunting" should not be such as to interfere with the free and quick starting of the centrifugally operated members as the engine speed increases.

Other and further objects will be apparent to one skilled in the art after a study of the specification and annexed drawings, wherein—

Figure 10:
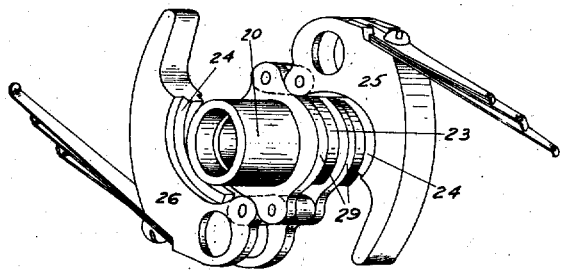
Fig. 10 is a perspective view of the driven member with the centrifugally operated members attached thereto.
Figure 11:
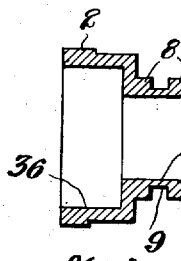
Figure 11 is a section through driving member 2 at right angles to the section shown in Fig. 2.
Figure 2:
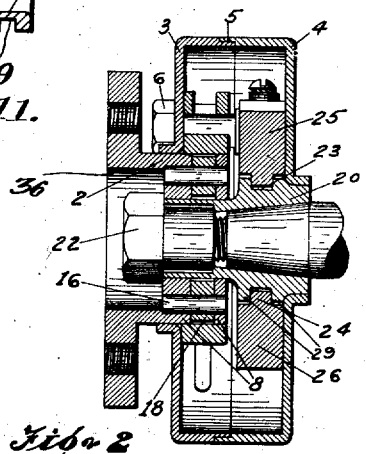
Fig. 2 is a section taken along the line 2—2 of Fig. 1.
Figure 4:
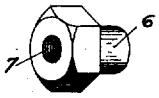
Fig. 4 is a view of one of the bushings that carries the centrifugal members connected to the driving member.
Figure 1:
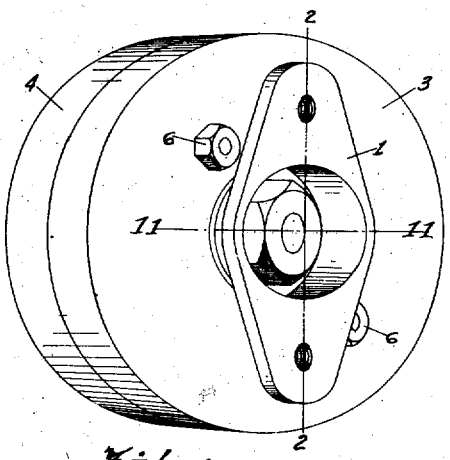
Figure 1 is a perspective view of my assembled governing device looking at the driving end.
Figure 5:
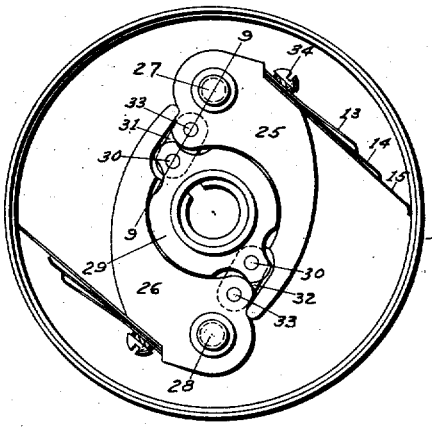
Figure 5 is a view of one part of the casing showing the driven member in normal position with the centrifugal arms in operative relationship thereto.
Figure 6:
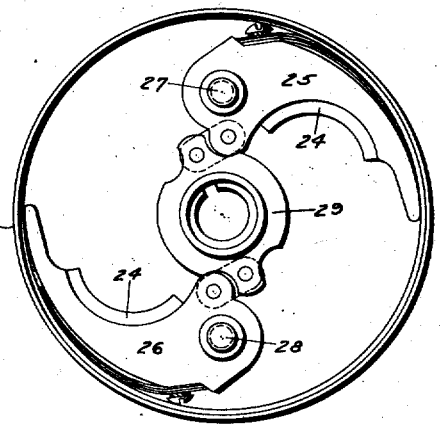
Fig. 6 is a view similar to Fig. 5 but with the centrifugally operated members in their fully operated position.
Figure 7:
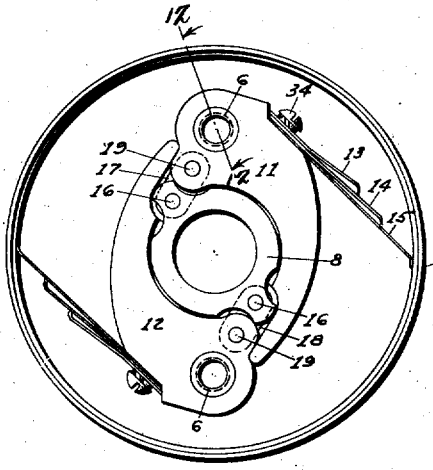
Fig. 7 is a view of the other part of the casing, that is, the left hand part of Fig. 2 showing the driving member in position therein and with the centrifugally operated members attached thereto.
Figure 8:
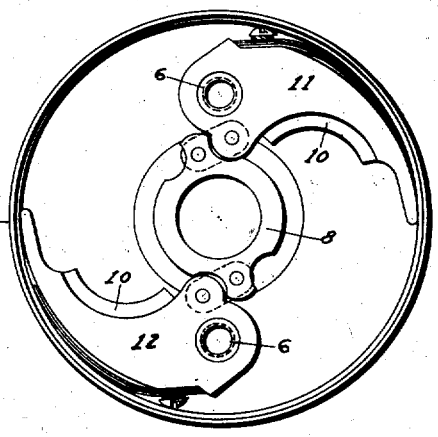
Fig. 8 is a view similar to Fig. 7 but with the centrifugally operated members in their fully operated position.
Figure 9:
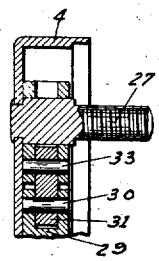
Fig. 9 is a sectional view along the line 9—9 of Fig. 5.
Figure 12:
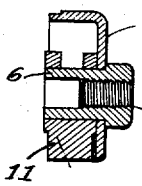
Figure 12 is a fragmentary section on the line 12/12 of Fig. 7 showing the weighted arm on the end of the screw bushing which is shown in Fig. 4.

Referring now to the details wherein like numbers refer to corresponding parts in the various views, 1 is a flange of a driving member 2 that is seated on one end, adjacent the nut 22, of the driven member 20, within one part 3 of a two part casing, the other part 4 of which is shouldered by an annular shoulder 5 to the part 3. The casing member 4 has fastened thereto in any suitable manner threaded studs 27 and 28, and when the parts 3 and 4 are assembled together the studs 27 and 28 extend through the casing member 3 and the said threaded ends are engaged by the thread 7 on the bearing bushings 6, which bushings are shown in the assembled position in Fig. 1 and more in detail in Figs. 4 and 12. From the latter figure it will be seen that the weighted arms 11 and 12 are pivoted on the inner ends of the bushings 6. The interior end of the driving member 2 has flanges 8 forming a groove 9 therebetween, similar to the groove 23 formed by the flanges 29 (see Fig. 10). The tongues 10 of the weighted arms 11 and 12 sit within the groove 9 when the said weighted arms are in normal position as shown in Fig. 7. The bore 35 of member 2 is adapted to fit over the smooth end of the driven member 20, which thus becomes, as has been stated, a seat for carrying the driving member 2. The counterbore 36 of the member 2 is to give clearance for the nut 22 as is shown in Fig. 2. The operation of the arms 11 and 12 is controlled by sets of springs 13, 14 and 15 in a manner similar to that described in my patent hereinbefore referred to. The operation of these springs will therefore be only briefly described herein.

Referring to Fig. 7, it will be seen that the flanges 8 carry two pins 16. These pins support links 17 and 18, the other ends of which are connected to the members 11 and 12 by pins 19 and it will be noted from this figure that the pins 16 and 19 are in the same straight line with the center of the bearing bushings 6. When the weighted arms 11 and 12 are in this position any torque applied to the driving member 2 cannot move the arms outward yet the arms 11 and 12 are free to move on the pivot pins 19 and will move very easily and for some little distance before the links 17 and 18 begin to pull on the pins 16. As the arms 11 and 12 move outward, due to centrifugal force, the springs 15, 14 and 13 are brought into successive operation and control the movement of the arms 11 and 12.

Figure 3:
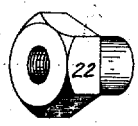
Fig. 3 is a view of the nut used for holding the driven member on to the driven shaft.

The other portion of the casing 4 encloses the driven member 20 that is adapted to be fastened to a driven shaft 21 by means of a key and the special nut 22 shown separately in Fig. 3. The driven member 20 has a groove 23 formed by flanges 29 corresponding to groove 9 in the driving member and for the same purpose, that is to say, to receive the tongues 24 of the arms 25 and 26 which are carried on studs 27 and 28 riveted or otherwise fastened to the casing 4. The flanges 29 carry pivot pins 30 to which are attached links 31 and 32, the other ends of which are fastened to pins 33. When the weights 25 and 26 are in normal position the pins 30 and 33 are in the same straight line with the studs 27 and 28 so that the arms 25 and 26 are locked, so to speak, so far as torque applied to the driven member 20 is concerned, yet the arms 25 and 26 are free to respond at once to centrifugal force. The action of the arms 25 and 26 is controlled by a set of springs 13, 14 and 15 similar to those used on the arms 11 and 12, the same being fastened by any suitable means, such as screws 34, to said arms.

When the two parts of the casing 3 and 4 are assembled the studs 27 and 28 pass through the inner end of the bearing bushings 6 and are engaged by the threaded portions 7 so that the studs and bushings serve to hold the two parts of the casing securely together enclosing all of the governing mechanism.

Concerning the operation of my device, it will be seen that as the arms 25 and 26 move outward, due to the centrifugal force, and under the control of springs 13, 14 and 15, the driven member 20 and shaft 21 are rotated to a certain angle with respect to the casing and further as the arms 11 and 12 move outward, due to centrifugal force and under the control of similar springs, the entire casing itself is rotated to an angle substantially the same as that turned by the driven member 20, hence the shaft of the ignition generator 21 with respect to the driving shaft that is attached to flange 1 is shifted an angle equal to the sum of the two angular movements previously described, therefore, it is apparent that this construction enables me to get a greater range of advance with a relatively small diameter and by the method of connecting the parts, as described, the magnetic kick at low speeds has no effect on the arms which control the range of advance, yet these arms are free to respond at once to centrifugal force and their movement is controlled by the springs which are successively brought into operation.

One of the advantageous features of my invention is that the weighted arms, springs, links, etc., are all interchangeable and the construction is such that it may be quickly adapted for right and left hand rotation by merely reversing the position of the centrifugally operated arms and springs carried by them. This is an important feature in the manufacture of such a device in large quantities.

While I have shown a preferred form of my invention, it will be apparent that numerous changes and alterations may be made in the details without departing from the spirit of my invention or the scope of the appended claims.

Having thus described my invention what I claim is:—

1. In a governing device the combination of, a two part casing having central openings in each part, a driving member positioned within the central opening of one part, a driven member positioned within the opening of the other part, studs fastened to that part of said casing enclosing the driven member, bearing bushings carried by the other part of said casing, centrifugally operated members carried on said studs, links connecting said centrifugally operated members to said driven member, centrifugally operated members carried by said bushings, links connecting said last mentioned centrifugally operated members to said driving member, resilient means acting on said centrifugally operated members to regulate their operation, said studs passing through said bearing bushings and means for engaging said studs to hold the two parts of said casing and inclosed mechanism in operative relationship.

2. In a governing device the combination of a casing, driving and driven members housed within said casing, independent sets of centrifugally operated members carried by said casing, one set having link connections with said driving member and the other set having link connections with said driven member whereby the response to centrifugal force by the one set connected to the driven member automatically moves the same in a given direction and response to centrifugal force by the other of said sets connected to the driving member automatically moves said casing and parts carried by it in a direction additive to the movement of the driven member.

3. In a governing device the combination of, a casing, driving and driven members housed within said casing, mechanism carried by the casing for coupling said members together including centrifugal means for shifting the driven member about its axis relative to the driving member and centrifugal means for shifting the casing and parts carried by it in a direction additive to that of the driven member as the speed of the driving member varies.

4. In a governing device the combination of, a driving member seated on a driven member, mechanism for coupling said members together including centrifugal means for shifting the driven member about its axis relative to the driving member and additional centrifugal means for shifting the angular position of the first mentioned centrifugal means in a direction corresponding to the direction of movement of the driven member as the speed of the driving member varies.

5. In a governing device the combination of, a driving member seated on a driven member, mechanism for coupling said members together including means for shifting the driven member about its axis relative to the driving member and additional means for shifting the angular position of the first mentioned means in a direction corresponding to the direction of movement of the driven member as the speed of the driving member varies.

6. In a governing device the combination of, a casing, a driven member positioned in one side of said casing and housed thereby, a driving member positioned within the opposite side of said casing and housed thereby and guidingly supported by a part of the driven member, mechanism carried by the casing for coupling said members together including centrifugal means for shifting the driven member about its axis relative to the driving member and further centrifugal means for shifting the entire casing and mechanism carried by it in a direction corresponding to that of the driven member as the speed of the driving member varies.

7. In a governing device the combination of, a casing, a driven member positioned within said casing, a driving member positioned within said casing, bearing bushings mounted on one portion of said casing, studs attached to another portion of said casing and passing through said bearing bushings with means for holding said studs and bushings in operative relationship, centrifugal means carried by said studs and said bearing bushings, links pivotally connecting a part of said centrifugal means to the driven member and a part to the driving member in such a manner that when said centrifugal means is in normal position each set of link pivots, studs and bearing bushings are in the same straight line, whereby said centrifugal means cannot be operated by torque only applied to the driving or driven members from a position of rest at low speeds of rotation as and for the purpose described.

8. In a governing device, a two part casing flanged together at their periphery, a driving member positioned within the casing and having a portion extending through one part of the casing, a driven member positioned within the casing and having a portion extending through the other part of the casing, bearing bushings movably carried by one part of the casing, studs attached to the other part of the casing and passing through said bushings with means for engaging the studs to hold the bushings, studs and parts of the casing in operative position, centrifugal arms carried on said studs and bushings, links pivoted at one end to the driven member and at the other end to a set of said arms in such a way that said pivot centers are in the same straight line and in line with the pivot center of said arms, links pivoted to the driving member and another set of arms in a similar manner as the first mentioned links whereby all of said arms are not responsive to torque only applied to either the driving or driven members during low rotative speeds thereof.

9. In a governing device, driving and driven members, a casing for inclosing said members, mechanism for coupling said members together including: studs and bushings carried by the casing, separate centrifugal means associated with the driving and driven members carried on the studs and bushings with links pivotally connecting the driving and driven members to their associated centrifugal means in such a way that at low rotative speeds of said members said centrifugal means are locked so far as torque applied to said members is concerned but easily responsive to centrifugal force.

10. In a governing device, driving and driven members, a casing for inclosing said members, mechanism for coupling said members together including: studs and bearing bushings fastened to said casing, centrifugal means carried on said studs for shifting the driven member about its axis relative to the driving member and separate centrifugal means carried on said bushings for shifting the angular position of the said casing in a direction corresponding to the direction of movement of the driven member, links pivotally connecting the driving and driven members to their associated centrifugal means in such a way that at low rotative speeds of said driving and driven members said centrifugal means are locked so far as torque applied to said members is concerned but easily responsive to centrifugal force as and for the purpose described.

11. In a governing device the combination of, a two part casing, a driving member positioned in one part and a driven member positioned in the other part, both parts carrying supports with means for fastening the supports and two parts of the casing in operative position, centrifugal members operatively mounted on said supports with connecting means to the driving and driven members whereby the centrifugal members attached to the driven member control its position within limits relative to the driving member and the centrifugal members attached to the driving member control the angular position within limits of the centrifugal members attached to the driven member.

12. In a device of the character described, the combination of a casing, driving and driven members within said casing, means carried by and within the casing cooperating with the driven member to automatically determine within limits the position of the driven member relative to the driving member and further means carried by and within the casing cooperating with the casing and driving member to automatically determine within limits the position of the casing relative to the driving member as the speed of the same varies.

13. In a governing apparatus of the class described, the combination of driving and driven members, weighted arms associated with both the driving and driven members for shifting said members relative to each other, said arms being mounted and having connecting parts between the said driving and driven members so that at low rotative speeds of the governing apparatus said connecting parts between the arms and its corresponding member are in such a position that a lock is formed whereby a relative shifting of the driving and driven members due to torque applied to said members, is prevented.

14. In a governing device, the combination of driving and driven members, and centrifugally controlled means for shiftably connecting said driving and driven members, said centrifugally controlled means including pivots therefor arranged so that at low rotative speeds of the device, said pivots are substantially in alignment thereby forming a lock so as to prevent the relative shifting of the two members due to a torque applied to the members.

15. In a governing device, the combination of driving and driven members, a pivoted centrifugally controlled member operated by said driving member, link mechanism coupling said controlled member with said driven member, the pivots for said link mechanism and for said centrifugally controlled member being in a straight line in one position of the members.

16. In a governing device, driving and driven members, mechanism for coupling said members together including pivotal supports carried by one of the members, centrifugal members pivotally carried thereby, and links pivotally connecting the driven member with said centrifugal members whereby that at low rotative speeds of said members, said centrifugal members are locked, so far as torque applied to said members is concerned, but are easily responsive to centrifugal force.

17. In a governing device, driving and driven members, mechanism including means responsive to centrifugal force for coupling said members together, a casing for enclosing said mechanism, pivotal supports fastened to said casing, said centrifugal responsive means pivotally carried on said supports for shifting the driven member about its axis relative to the driving member, links pivotally connecting the driven member and said centrifugal responsive means, said link pivots being in a straight line including the pivot for the centrifugal responsive means, so that at low rotative speeds of said driving and driven members, said centrifugal means are locked, so far as torque applied to said member is concerned, but are easily responsive to centrifugal force, as and for the purpose described.

In witness whereof, I affix my signature.

EDWARD MOORE.